N. J. DAYSH AND C. H. HAPGOOD.
MILKING MACHINERY.
APPLICATION FILED SEPT. 23, 1919.

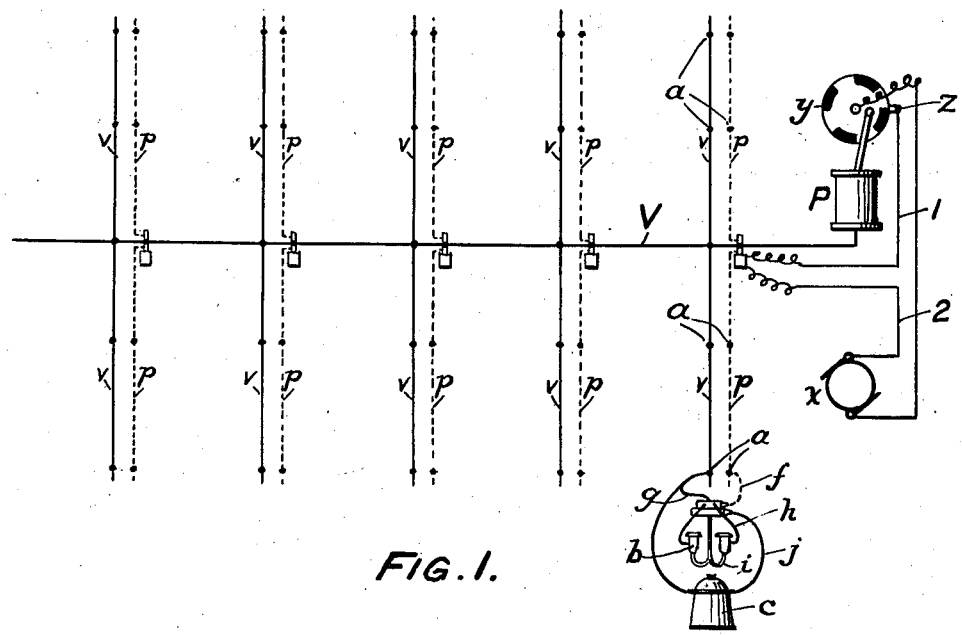
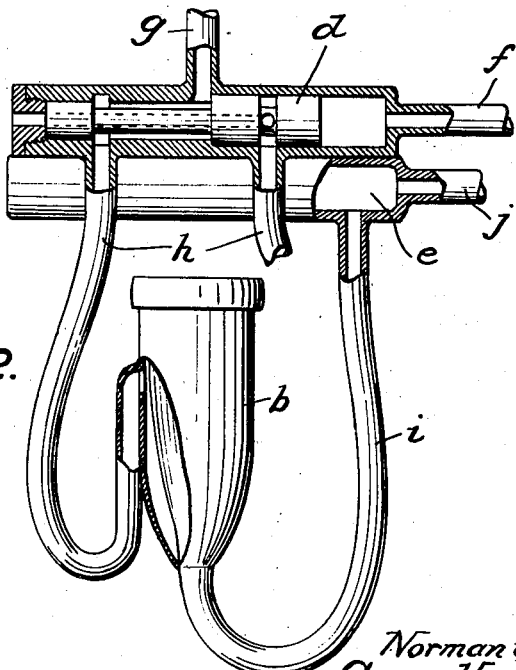

1,405,104.

Patented Jan. 31, 1922.
2 SHEETS—SHEET 2.

INVENTORS
Norman John Daysh and
Cyrus Howard Hapgood
BY
Frank S. Busser
ATTORNEY.

UNITED STATES PATENT OFFICE.

NORMAN JOHN DAYSH, OF POUGHKEEPSIE, NEW YORK, AND CYRUS HOWARD HAPGOOD, OF DANVERS, MASSACHUSETTS, ASSIGNORS TO THE DE LAVAL SEPARATOR COMPANY, OF NEW YORK, N. Y., A CORPORATION OF NEW JERSEY.

MILKING MACHINERY.

1,405,104.   Specification of Letters Patent.   Patented Jan. 31, 1922.

Application filed September 23, 1919. Serial No. 325,650.

*To all whom it may concern:*

Be it known that we, NORMAN JOHN DAYSH and CYRUS HOWARD HAPGOOD, respectively a subject of the King of Great Britain and a citizen of the United States, residing at, respectively, Poughkeepsie, county of Dutchess, State of New York, and Danvers, county of Essex, and State of Massachusetts, have invented a new and useful Improvement in Milking Machinery, of which the following is a full, clear, and exact description, reference being had to the accompanying drawings, which form a part of this specification.

It is known, in the art of milking machines of the pneumatic pulsating type, that when pulsations are transmitted to the teat cups from a pulsator located at relatively long distance, the pulsations are comparatively weak. Again, where the teat cups are connected to the pulsation line at widely varying distances from the pulsator, the pulsations in the teat cups at the different locations are of such different strength that if they are properly regulated to give pulsations of the required strength to the teat cups when relatively near the pulsator, the pulsations decrease in strength at the teat cups located at a more remote distance.

These objections have been found to be particularly serious in that type of installation comprising a vacuum line, a pulsation line connected with a master or primary pulsator, sets of two-chamber teat cups whose inner chambers are connected with the milk pail and the vacuum line, and secondary pulsators, one (say) for each set of teat cups, connected with the pulsation line and operable by the pulsations therein to create pneumatic pulsations in the outer teat cup chambers. Examples of such a type of milking machine are comprised in the Leitch Patent, No. 1,196,000, dated August 29, 1916, and the Forsyth Patent, No. 1,257,688, dated February 26, 1918. In such a machine the master pulsator is located at a point where mechanism power is conveniently available, generally at the pump that produces the vacuum in the vacuum line, and at various points along the vacuum and pulsation pipes, cocks are provided to permit working connections to be established between the pipes and the branch pipe connected with the pulsator pail and teat cups.

When these connections are made at a point more or less remote from the master pulsator, the master pulsations are too weak to operate the secondary pulsator. Without some means for overcoming this difficulty, the practical use of milking machinery of the type above described would be limited to installations wherein conditions permit the location of the master pulsator close to the branch pipe connections, and notwithstanding its pronounced advantages over other types of milking machinery, it will be commerically inoperative where conditions compel the location of the primary pulsator at a substantial distance from the branch pipe connections.

The only feasible means of carrying the pulsations from the master pulsator through a long line and transmitting them to the secondary pulsator in substantially their full strength are those set forth in the Daysh Patent No. 1,276,184, dated August 20, 1918, and in an application for patent filed by the last named patentee October 29, 1918, Serial No. 260,116. In the Daysh patent a relay valve, controlled by the pulsations of the master pulsator, operates to produce secondary pulsations in that part of the pulsation pipe compartively distant from the primary pulsator. This system is efficient and is applicable to an installation of any size. In Daysh's application, a modification of his patented system is set forth, wherein the vacuum pump and master pulsators are located at a point intermediate the length of the vacuum pipe and the pulsation pipe is divided into a plurality of separate and independent lines; the master pulsators, operated from the vacuum pump or other main source of power, acting to connect each pulsation pipe alternately with atmosphere and vacuum.

In both these systems the master pulsator is located at a comparatively great distance from some of the relays and from some of the cocks adapted for connection to the milking machine unit and in many barns the most convenient location for the vacuum pump and master pulsator is at a considerable distance from the nearest stanchion. Either arrangement involves the employment of quite a length of pulsation pipe and considerable power is required to transmit pulsations through these long pipes, thus adding to the cost of installation, as well as the cost of operation.

In our invention, instead of having a pulsation pipe or pipes pneumatically connected with the primary source of power, we utilize pulsation pipes some or all of which may be remote from the source of power and whose combined length may be materially shorter than the length of the vacuum pipe. Our invention necessitates the transmission of the master pulsations throughout a length of pipe considerably shorter than that through which either the master pulsations or relay pulsations have been transmitted in the relay system. Indeed, in many instances the length of transmission may be so short as to dispense with the necessity for using secondary pulsators, thereby materially reducing the cost of the milking machine unit.

Preferred embodiments of the invention are shown in the drawings, wherein—

Fig. 1 is a diagram of a complete installation.

Fig. 2 is a sectional view of a milking machine unit.

From the vacuum pump P extends a main vacuum pipe line V, from which branch vacuum pipe lines v, v, etc., lead to the different stanchions. Pulsation pipe lines p, p., etc., correspond to the branch vacuum lines. The branch vacuum lines v and pulsation lines p are provided with cocks a adapted for attachment to a milking machine unit Each milking machine unit (see Fig. 2) comprises a set of double chamber teat cups b, a milk pail c, a secondary pulsation valve d, and a milk chamber e. The secondary pulsator is adapted for connection, through the pipe f, to any pulsation line p and through the pipe g to any vacuum line v. The secondary pulsator d is connected, through pipes h, to the outer or pulsation chambers of the teat cups. The milk chamber e is connected, through pipes i, with the inner teat cup chambers and, through the pipe j, with the milk pail.

The milking machine unit operates on the same principle as those of Leitch and Forsyth hereinbefore set forth and need not be particularly described.

While the arrangement illustrated in Fig. 1 shows two vacuum branch lines v branching in opposite directions from a given point on the main vacuum line V, and two pulsation lines p corresponding to the two branch vacuum lines v, this arrangement is merely for the purpose of explanation. If the construction of the barn does not permit this arrangement, one of the branch vacuum lines of each pair, and its corresponding pulsation line, may be omitted. We shall, however, describe a construction of primary pneumatic pulsator adapted to this arrangement.

The primary pneumatic pulsator (see Fig. 3) comprises a valve chamber k in which reciprocates a valve having pistons m and n of different diameters. The valve cylinder k is provided with a port o leading to the vacuum pipe V and ports r, r, connected respectively with the two pulsation lines p, p.

Connected with the valve casing is a solenoid s the core t of which is carried on the end of the valve stem. u is a port admitting air against piston m. w is a port admitting air against piston n.

The solenoid is intermittently energized in any suitable manner, as, for example, by any electric switch which is alternately opened and closed. In Fig. 1 is shown a small generator x operable (say) from the vacuum pump P, a rotary commutator y operable from the vacuum pump or other suitable means, a brush z, and an electric circuit comprising a connection 1 between brush z and solenoid and a connection 2 between the solenoid and commutator.

Figure 3:
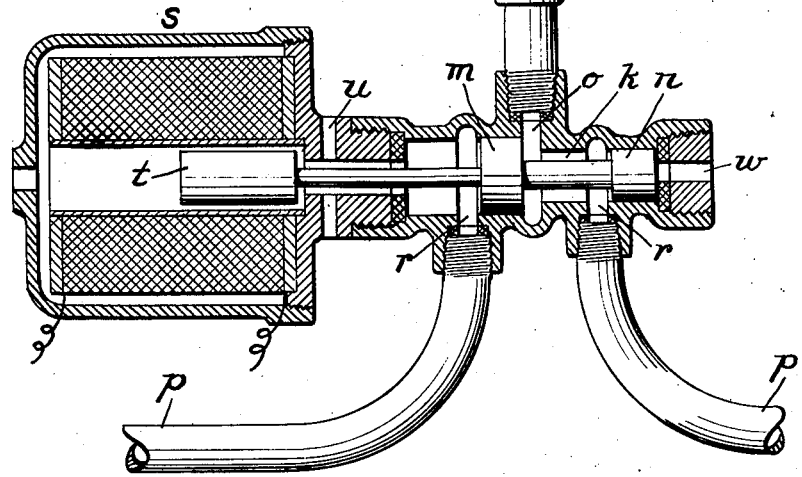
Fig. 3 is a sectional view of one of the relay pulsators and its actuating solenoid.

When the solenoid of Fig. 3 is deenergized, the air pressure on the larger piston overcomes the air pressure on the smaller piston n, moving the valve into the position shown in Fig. 3. In this position, one of the pulsation pipe lines p is connected with atmosphere and the other with vacuum. When the solenoid is energized, the valve is moved against air pressure to the left and the pipe p that was before connected with atmosphere is now connected with the vacuum line V, while the other pipe p that was before connected with vacuum is now connected with atmosphere through the port r. Thus, through each pulsation line, pneumatic pulsations are transmitted to the secondary valve of any milking machine unit that is connected up, which in turn transmits pneumatic pulsations to the outer chambers of the teat cups, the inner teat cup chambers being connected with vacuum.

Figure 4:
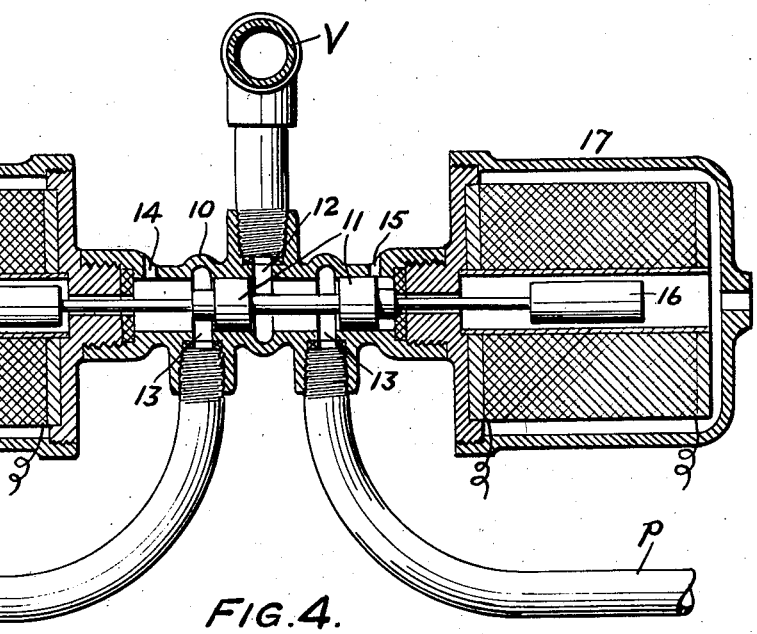
Fig. 4 is a view of a modification of Fig. 3.

In Fig. 4 is shown a valve casing 10 containing a reciprocatory valve 11 having pistons of equal area; the valve casing having a port 12 connected with the main vacuum pipe V, ports 13, 13 connected with the respective pulsation pipes p, p and air admission ports 14 and 15. Opposite ends of the valve stem are connected to the cores 16 of two opposing solenoids 17. These solenoids are alternately energized, thereby reciprocating the valve 11, the valve acting in the same manner as the valve of Fig. 3 to produce pneumatic pulsations in the pulsation pipes *p*.

The primary pneumatic pulsators, by the arrangement above described, may be brought so close to the milking machine unit that in many instances it is found entirely practicable to discard the secondary pulsators altogether. In this event the valve *d* (Fig. 2) may be taken out of its chamber, the connection *g* to suction removed, and the ends of the chamber closed, the pulsation in pipe *f* being then transmitted directly through the pipes *h* to the inflation chambers of the teat cups.

Where, in the claims, we refer to pressure, we intend to include any degree of pressure above the partial vacuum in the vacuum pipes. For the sake of simplicity, atmospheric pressure will usually be preferred.

Having now fully described our invention, what we claim and desire to protect by Letters Patent is:

1. In a milking machine, the combination with a milking machine unit comprising a double chambered teat cup, a pulsation pipe, a secondary pneumatic pulsator connected with, and controlled by the pulsations in, said pipe, a pipe connection from the pulsator to the outer teat cup chamber, and a vacuum pipe connected with the pulsator and the inner teat cup chamber; of a primary pneumatic pulsator adapted to produce pneumatic pulsations in said pulsation pipe, and electrically operating means controlling the operation of said primary pneumatic pulsator.

2. In a milking machine system, in combination, a vaccum line, an electric circuit paralleling the vacuum line, a milking machine unit including a secondary pneumatic pulsator, and an electrically operated primary pneumatic pulsator connected with said circuit and whose operation is controlled by said electric circuit and connected also with pressure, with the vacuum line and with the secondary pulsator of the milking machine unit and adapted to convey pneumatic pulsations to the latter.

3. In a milking machine system, in combination, a vacuum pump, a vacuum line connected therewith, a pneumatic pulsation line, a primary pneumatic pulsator adapted to produce pulsations in the pneumatic pulsation line, a double chamber teat cup the inner chamber of which is connectible with the vacuum line, a secondary pulsator connectible with and controllable by the pulsations in the pneumatic pulsation lines and connected with, and producing pulsations in, the outer teat cup chamber, and electrically operating means, independent of the vacuum pump, controlling the operation of the primary pneumatic pulsator.

4. In a milking machine system, the combination with a vacuum line, of a number of milking machine units each comprising a secondary pulsator, a double chamber teat cup, a pulsation pipe and a vacuum pipe connectible with the vacuum line; a primary pneumatic pulsator connected with the vacuum line and with pressure and adapted for connection with the pulsation pipes of the units and operable when so connected to connect the pulsation pipes alternately with suction and pressure, and electrically operating means controlling the operation of the pneumatic pulsator.

5. In a milking machine system, the combination with a vacuum line; of a number of milking machine units each comprising a double chamber teat cup, a vacuum pipe connected with the inner teat cup chamber and connectible with the vacuum line, a pulsation pipe, and a secondary pneumatic pulsator controlled by the pulsations in the pulsation pipe and connected with the outer teat cup chamber and operating to produce pneumatic pulsations therein; a primary pneumatic pulsator connected with the vacuum line and with pressure and adapted for connection with the secondary pulsators of the units and operable when so connected to connect the pulsation pipes alternately with suction and pressure, and electrically operating means controlling the operation of the primary pneumatic pulsator.

6. In a milking machine system, in combination, a series of primary pneumatic pulsators, electrically operating means controlling the operation of said pulsators, and a milking machine unit including a secondary pneumatic pulsator and pipe connections therefrom adapted for connection with any of said primary pneumatic pulsators for the production of pneumatic pulsations in said secondary pulsator.

7. In a milking machine system, the combination with a milking machine unit comprising a double chambered teat cup, a pulsation pipe, a secondary pneumatic pulsator connected with, and controlled by the pulsations in, said pipe, a pipe connection from the pulsator to the outer teat cup chamber, and a vacuum pipe connected with the pulsator and the inner teat cup chamber; of an electric circuit, and a plurality of primary pneumatic pulsators in said circuit controlled in their operation by said circuit and any of which, when connected with said pulsation pipe, is adapted to produce pulsations therein, thus effecting the uniform operation of the milking machine unit regardless of its distance from the origin of pulsations.

8. In a milking machine system, the combination with a main vacuum pipe line, of a series of branch vacuum pipes, a series of pulsation pipes corresponding to the branch vacuum pipes, a series of primary pneumatic pulsators connected with the vacuum line, with the pulsation pipes and with pressure and operable to connect the pulsation pipes alternately with suction and pressure, a milking machine unit comprising teat cups and a secondary pneumatic pulsator and adapted for connection to any branch vacuum pipe and any corresponding pulsation pipe, electrically operating means controlling the operation of the primary pulsators, and means adapted to establish suction in the main vacuum pipe line and effect the operation of the electrically operating means.

9. In a milking machine system, the combination with a main vacuum pipe line, of pairs of branch vacuum pipes connected with the main vacuum pipe line along different parts of the length thereof, a series of primary pneumatic pulsators, each of said pulsators being located at the junction of the main vacuum pipe line with two branch vacuum pipes of a pair, pairs of pulsation pipes extending along the respective pairs of branch vacuum pipes, there being ports connecting each primary pulsator with the vacuum line, with a pair of pulsation pipes and with pressure, a milking machine unit comprising teat cups and a secondary pulsator adapted for connection to any branch vacuum pipe and any pulsation pipe, and electrically operating means controlling the operation of the several primary pneumatic pulsators.

10. In a milking machine system, the combination with a main vacuum pipe line, pairs of branch vacuum pipes connected with the main vacuum pipe line along different parts of the length thereof, a series of primary pneumatic pulsation valves, each of which is located at the junction of the main vacuum pipe line with two branch vacuum pipes of a pair, pairs of pulsation pipes extending along the respective pairs of branch vacuum pipes, each valve adapted in its operation to connect one pulsation pipe of a pair with pressure and another with suction and then reverse the connections, a milking machine unit comprising teat cups and a secondary pulsator adapted for connection to any branch vacuum pipe and any pulsation pipe, and electrically operating means controlling the operation of the several primary pneumatic pulsators.

11. In a milking machine system, in combination, a source of partial vacuum, a fixedly positioned vacuum pipe line system extending therefrom, a series of fixedly positioned primary pneumatic pulsators arranged at different points along the vacuum pipe line system, a portable milking machine unit comprising a pulsation pipe adapted for connection with and disconnection from any of the fixed primary pulsators, the latter adapted, when operated and when in communication with the pulsation pipe of the portable milking machine unit, to open said pulsation pipe to communication alternately with pressure and with the vacuum pipe line system, and fixedly positioned electrical means for independently operating each primary pulsator.

12. In a milking machine system, in combination, a source of partial vacuum, a fixedly positioned vacuum pipe line system extending therefrom, a series of fixedly positioned primary pneumatic pulsators arranged at different points along the vacuum pipe line system, fixedly positioned electrically actuated means for independently operating each primary pulsator; a portable milking machine unit comprising a milk pail, double chambered teat cups, a pulsation pipe and a vacuum pipe; the last two pipes being adapted for connection with the vacuum pipe line system and any of said primary pulsators; the latter adapted, when operated and when in communication with the pulsation pipe of the portable milking machine unit, to connect said pulsation pipe alternately with pressure and with the vacuum pipe line system.

In testimony of which invention, we have hereunto set our hands, at city of New York, on this 11th day of September, 1919.

NORMAN JOHN DAYSH.
CYRUS HOWARD HAPGOOD.

Witnesses:
   GEO. D. TALLMAN,
   GEO. R. REMINGTON.